(12) United States Patent
Awasthi et al.

(10) Patent No.: US 11,689,628 B2
(45) Date of Patent: Jun. 27, 2023

(54) SYSTEM FOR ESTABLISHING COMMUNICATION

(71) Applicant: Anand Purnanand Awasthi, Mumbai (IN)

(72) Inventors: Anand Purnanand Awasthi, Mumbai (IN); Amit Gajanan Patkar, Mumbai (IN); Satish Shivrudra Mokashi, Mumbai (IN)

(73) Assignee: Anand Purnanand Awasthi, Maharashtra (IN)

( * ) Notice: Subject to any disclaimer, the term of this patent is extended or adjusted under 35 U.S.C. 154(b) by 689 days.

(21) Appl. No.: 16/494,714

(22) PCT Filed: Mar. 14, 2018

(86) PCT No.: PCT/IB2018/051700
§ 371 (c)(1),
(2) Date: Sep. 16, 2019

(87) PCT Pub. No.: WO2018/167686
PCT Pub. Date: Sep. 20, 2018

(65) Prior Publication Data
US 2020/0104772 A1    Apr. 2, 2020

(30) Foreign Application Priority Data

Mar. 16, 2017 (IN) .............................. 201721009133

(51) Int. Cl.
*G06F 15/177* (2006.01)
*H04L 67/306* (2022.01)
(Continued)

(52) U.S. Cl.
CPC ........ *H04L 67/306* (2013.01); *H04L 43/0805* (2013.01); *H04L 67/141* (2013.01)

(58) Field of Classification Search
CPC .... H04L 43/0805; H04L 51/18; H04L 67/141
See application file for complete search history.

(56) References Cited

U.S. PATENT DOCUMENTS 6,771,766 B1    8/2004  Shafiee et al.
7,095,840 B2    8/2006  Dezonno et al.
(Continued)

FOREIGN PATENT DOCUMENTS

CN    114974311 A  *  8/2022
EP       3121997 A1 *  1/2017  ........... G06F 9/5077
(Continued)

OTHER PUBLICATIONS

Real Time Information and Communication Center based on webRTC (Sri Lanka Institute of Information Technology Computing (PVT) Ltd), International Journal of Scientific Research Publications, vol. 6, Issue 4, Apr. 2016, (6 pgs).

(Continued)

*Primary Examiner* — Yves Dalencourt
(74) *Attorney, Agent, or Firm* — Hickman Becker Bingham Ledesma LLP

(57) ABSTRACT

Disclosed is a system for establishing communication channel between a user and a resource. A data capturing module captures data corresponding to the user of the web service. A resource identification module identifies the resource based on comparison of one or more attribute of the resource with the data. A determination module determines at least one mode of a communication channel between the User and the resource by comparing a bandwidth of the communication channel available with one of the user and the resource. Examples of the communication channel comprises a video call, an audio call, an automated chat, and an email. A connection module connects the resource to the user via the at least one mode of the communication channel.

8 Claims, 9 Drawing Sheets

(51) Int. Cl.
    *H04L 43/0805*    (2022.01)
    *H04L 67/141*    (2022.01)

(56) References Cited

U.S. PATENT DOCUMENTS

| | | | | |
|---|---|---|---|---|
| 7,668,531 B1* | 2/2010 | Parks | ................ | H04Q 3/0029 |
| | | | | 370/352 |
| 7,996,251 B2 | 8/2011 | Kannan et al. | | |
| 8,582,556 B2 | 11/2013 | Stern et al. | | |
| 8,767,948 B1* | 7/2014 | Riahi | ................ | H04M 3/5175 |
| | | | | 379/266.01 |
| 9,819,626 B1* | 11/2017 | Berg | ................ | H04L 41/5009 |
| 10,447,777 B1* | 10/2019 | Djordjevic | ............ | H04L 67/104 |
| 10,694,036 B1* | 6/2020 | Webster | ............. | H04M 3/4931 |
| 11,269,665 B1* | 3/2022 | Podgorny | .............. | G06N 20/00 |
| 2002/0073150 A1 | 6/2002 | Wilcock | | |
| 2004/0039775 A1 | 2/2004 | Yoshida et al. | | |
| 2005/0038876 A1* | 2/2005 | Chaudhuri | ........... | G06F 16/9537 |
| | | | | 709/219 |
| 2005/0047579 A1* | 3/2005 | Salame | ................ | H04L 65/401 |
| | | | | 379/265.09 |
| 2007/0201366 A1* | 8/2007 | Liu | ........................ | H04L 47/808 |
| | | | | 370/235 |
| 2007/0201673 A1* | 8/2007 | Annadata | ............ | H04M 3/5235 |
| | | | | 379/265.01 |
| 2009/0245500 A1 | 10/2009 | Wampler | | |
| 2010/0157920 A1* | 6/2010 | Choi | ................... | H04L 12/2801 |
| | | | | 370/329 |
| 2012/0185906 A1* | 7/2012 | Doets | ................. | H04L 65/1069 |
| | | | | 725/126 |
| 2012/0221955 A1* | 8/2012 | Raleigh | ................... | H04W 4/24 |
| | | | | 726/1 |
| 2014/0047472 A1* | 2/2014 | Haberman | ........ | H04N 21/23614 |
| | | | | 725/32 |
| 2014/0280991 A1* | 9/2014 | Lederman | .............. | H04L 67/306 |
| | | | | 709/228 |
| 2015/0120357 A1 | 4/2015 | Tuchman et al. | | |
| 2015/0310377 A1* | 10/2015 | Schlumberger | .............................. | |
| | | | | G06Q 10/063114 |
| | | | | 705/7.15 |
| 2016/0226978 A1* | 8/2016 | Logan | .................... | H04L 63/08 |
| 2016/0323449 A1* | 11/2016 | Drotos | ................. | G06Q 40/025 |
| 2017/0374197 A1* | 12/2017 | Rumpf | ................ | H04M 3/5125 |
| 2020/0162612 A1* | 5/2020 | Mullane | ................ | H04M 15/58 |

FOREIGN PATENT DOCUMENTS

| | | | | |
|---|---|---|---|---|
| WO | WO-2011082638 A1 * | 7/2011 | .......... | H04M 3/2227 |
| WO | 2017192684 A1 | 11/2017 | | |
| WO | WO-2017192684 A1 * | 11/2017 | ......... | G06F 17/2785 |
| WO | WO-2021130803 A1 * | 7/2021 | | |

OTHER PUBLICATIONS

International Search Report and Written Opinion issued in application No. PCT/IB2018/051700, dated Jun. 26, 2018 (10 pgs).
Brown et al., "The Interaction Center Platform," Copyright © 2009-2015 Interactive Intelligence, Inc., Update Jan. 2015, version 3 (31 pgs).

\* cited by examiner

SYSTEM FOR ESTABLISHING COMMUNICATION

CROSS REFERENCE TO RELATED APPLICATIONS AND PRIORITY

This patent application claims priority to Indian Patent Application Number 201721009133 filed on Mar. 16, 2017, the entirety of which is hereby incorporated by reference.

TECHNICAL FIELD

The present subject matter described herein, in general, relates to communication and in particularly a system and method to establish communication channel between a user and a resource.

BACKGROUND

Currently, internet is increasingly available to individuals across remote locations of the world. Because of the increasing reach of the internet, websites, web applications, web services, social media channels and e-commerce applications are being adopted as a common practice by businesses and many individuals or users. The users opt for variety of business operations like a product or a service purchase, user support services such as product replacement, undelivered package, wrong shipment, change of address of shipment, damages to the product, complaint registration, complaint resolution and many more. In order to help the user resolve queries, the e-commerce or online business platforms provide non-real time or static assistance to the users in the form of chats, SMS, audio or video call, forms and the like. Some of the web services delivery platforms are providing services via self-service channels such as an auto-generated response system. The aforementioned services are developed based upon the problems faced by the user in the past related to the product or service. The web service delivery platforms fail to resolve the problems of every individual transacting over the e-commerce or online business platform in a preferred language. The users across the world speak multiple languages hence it becomes troublesome and restrictive for the users to do business over the e-commerce or online business applications as the language of the applications is usually English.

The web service delivery platforms are unable to integrate data across all communication channels into a single repository and typically store user as well as transaction information in different platforms and databases. It may be understood that obtaining or creating a single view of user across the globe is extremely tedious job. In addition to the aforementioned knowledge, the web service platforms are incapable of providing real-time data pertaining to each interaction of the user over the system creating many problems for big data integration.

The web service platform also fails to provide assistance to the user via a video call or an audio call because of fluctuating internet connection. The web service platforms also fail to provide assistance in real time to the user. As there is no common platform to provide assistance to the user, traffic at the web service platform increases resulting in increase in wait time at the user's end.

SUMMARY

Before the present systems and methods for establishing communication channel between a user and a resource, are described, it is to be understood that this application is not limited to the particular systems and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for establishing communication channel between the user and the resource and the concepts are further described below in the detailed description. This summary is not intended to identify essential features of the claimed subject matter nor is it intended for use in determining or limiting the scope of the claimed subject matter.

In one implementation, a method for establishing a communication channel between a user and a resource is disclosed. In order to establish the communication channel, initially, data corresponding to the user of a web service may be captured. In one aspect, the data may comprise at least one of a user name, a user ID, a language, a location, compliance rules of the location, a browsing history, a browsing pattern, a document, a feedback of the resource, a disposition action and a time zone. Once the data is captured, a resource may be identified based on comparison of one or more attribute of the resource with the data. In one aspect, the attribute may include one or more of a spoken language, a preferred language, a field of expertise, a geographic location, a time zone, a network information, and a device information of the resource. After identifying the resource, at least one mode of a communication channel between the user and the resource may be determined by comparing a bandwidth of the communication channel available with one of the user and the resource. In one aspect, the communication channel comprises one or more of a video call, an audio call, an automated chat, and an email. Subsequent to the determination of the communication channel, the resource may be connected to the user via at the least one mode of the communication channel, thereby establishing the communication channel between the user and the resource of the web service. In one aspect, the aforementioned method for establishing the communication channel between the user and the resource of the web service may be performed by a processor using programmed instructions stored in a memory.

In another implementation, a system for establishing communication channel between a user and a resource is disclosed. The system may comprise a processor and a memory coupled to the processor. The processor may execute a plurality of modules present in the memory. The plurality of modules may comprise a data capturing module, a resource identification module, a determination module, and a connection module. The data capturing module may capture data corresponding to the user of a web service. In one aspect, the data comprises of at least one of a user name, a user ID, a language, a location, compliance rules of the location, a browsing history, a browsing pattern, a document, a feedback of the resource, a disposition action and a time zone. The resource identification module identifies the resource based on comparison of one or more attribute of the resource with the data. In one aspect, the attribute comprises a spoken language, a preferred language, a field of expertise, a geographic location, a time zone, a network information, and a device information of the resource. The determination module determines at least one mode of a communication channel between the user and the resource by comparing a bandwidth of the communication channel available with one of the user and the resource. In one aspect, the communication channel may comprise at least a video call, an audio call, an automated chat, and an email. The connection module may connect the resource to the user via the at least one mode of the communication channel, thereby establishing the communication channel between the user and the resource of the web service.

In yet another implementation, non-transitory computer readable medium embodying a program executable in a computing device for establishing communication channel between a user and a resource is disclosed. The program may comprise a program code for capturing data corresponding to a user of a web service. In one aspect, the data may comprise at least one of a user name, a user ID, a language, a location, compliance rules of the location, a browsing history, a browsing pattern, a document, a feedback of the resource, a disposition action and a time zone. The program may further comprise a program code identifying the resource wherein the resource is identified based on comparison of one or more attribute of the resource with the data. In one aspect, the attribute comprises a spoken language, a preferred language, a field of expertise, a geographic location, a time zone, a network information, and a device information of the resource. The program may further comprise a program code for determining at least one mode of a communication channel between the user or the resource by comparing a bandwidth of the communication channel available with one of the user and the resource. In one aspect, the communication channel comprises at least a video call, an audio call, an automated chat, and an email. The program may further comprise a program code for connecting the resource to the user via the at least one mode of the communication channel, thereby establishing the communication channel between the user and the resource of the web service.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
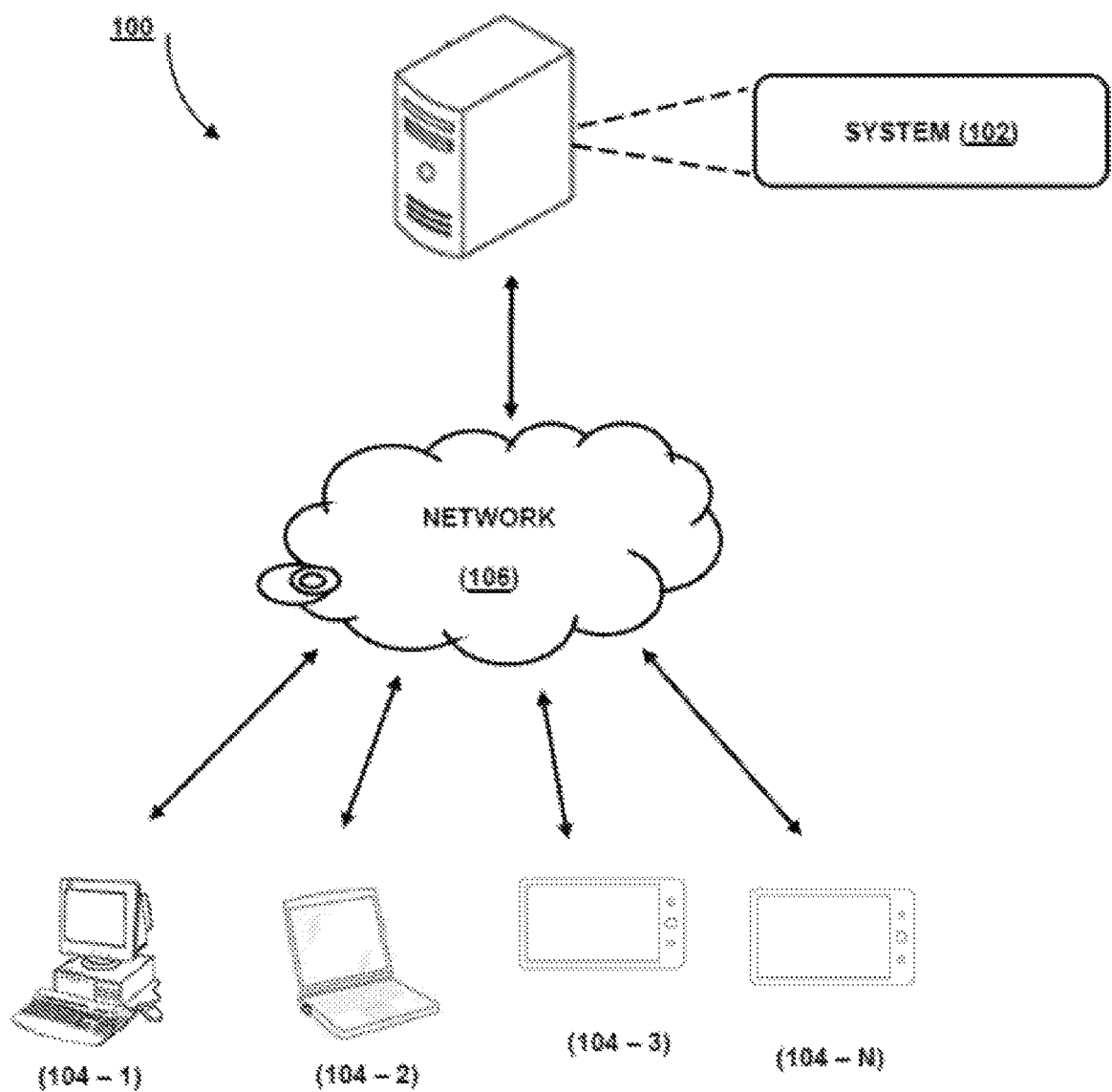
FIG. 1 illustrates a network implementation of a system for establishing communication channel between a user and a resource, in accordance with an embodiment of the present subject matter.

Some embodiments of the present disclosure, illustrating all its features, will now be discussed in detail. The words "capturing", "generating", "providing", "distributing", "determining", "identifying", "receiving", "monitoring", "migrating", "enabling", "initiating", "providing" and "connecting" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods for establishing communication channel between a user and a resource are now described. The disclosed embodiments of the system and method for establishing communication channel between the user and the resource are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for establishing communication channel between the user and the resource is not intended to be limited to the embodiments illustrated, but is to be accorded the widest scope consistent with the principles and features described herein.

The present subject matter discloses a system and method for establishing communication channel between the user and the resource of a web service. Example of the web service may include an e-commerce platform, a call centre, a virtual store, a delivery center and others. In one implementation, data corresponding to the user of the web service may be captured. In one aspect, the data comprise a user name, a user ID, a language, a location, compliance rules of the location, a browsing history, a browsing pattern, a document, a feedback of the resource, a disposition action, a time zone and the like. Further to capturing the data, a resource may be identified based on comparison of one or more attribute of the resource with the data. Examples of the attribute comprises a spoken language, a preferred language, a field of expertise, a geographic location, a time zone, a network information, a device information of the resource, and the like. After determining the resource, at least one mode of a communication channel between the user and the resource may be determined by comparing the bandwidth available with the user and a predefined threshold of the bandwidth for the communication channel. In one aspect, the communication channel comprises one or more of a video call, an audio call, an automated chat, and an email and the like. Further to the determination of the communication channel, the resource may be connected to the user via at least one mode of the communication channel. In one aspect, the connection may be based upon the bandwidth available with the user or the resource, thereby establishing the communication channel between the user and the resource of the web service.

In addition to the above functionalities, big data sets comprising data corresponding to the user may also be analyzed. Furthermore, different business applications using an API or a widget of the web service via cloud interface may also be integrated. It may be understood that the resource of the web service may be deployed across a world and may be operating in different time zones. Also the user and the resource may be connected in real time via at least one mode of a communication channel. In addition, if the user or the resource is not connected to the internet, the system may establish a Public Switched Telephone Network (PSTN) call between the user and the resource. In one example, compliance solutions to an administrator of the web service may also be provided. It is advantageous, that the system may distribute the communication traffic from the user to one or more resources present at different geographical location. These advantages are not the only advantages and any person skilled in the art may identify one or more advantages for the aforementioned description.

Although the present disclosure for establishing communication channel between the user and the resource is explained considering that the system 102 is implemented on a server, it may be understood that the system 102 may be implemented in a variety of computing systems, such as a laptop computer, a desktop computer, a notebook, a workstation, a mainframe computer, a server, a network server, a distributed computing architecture, a virtual machine environment, and a cloud-based computing environment. It may be understood that the system 102 may be configured to receive, share and store data from a system database configured inside the system 102. In one implementation, the system 102 may access data from databases installed at different geographical locations, or in parts with the system database. It will be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, a mobile phone, a landline telephone, a chord less telephone, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the Internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Referring now to FIG. 1, a network implementation 100 of a system 102 for establishing communication channel between a user and the resource is disclosed. In order to establish the communication channel between the user and the resource, initially, the system 102 captures data corresponding to a user of a web service via network 106. In one aspect, the data may comprise a user name, a user ID, a language, a location, compliance rules of the location, a browsing history, a browsing pattern, a document, a feedback of the resource, a disposition action, a time zone and a like. Once the data is captured, the system 102 identifies a resource based on comparison of one or more attribute of the resource with the data. In one aspect, the attribute may include a spoken language, a preferred language, a field of expertise, a geographic location, a time zone, a network information, and a device information of the resource, and the like. Subsequent to the identification of the resource, the system 102 determines at least one mode of a communication channel between the user and the resource by comparing a bandwidth of the communication channel available with one of the user and the resource. In one aspect, the communication channel comprises at least a video call, an audio call, an automated chat, and an email and the like. After determining the communication channel, the system 102 connects the resource to the user, over the network 106, via at least one mode of the communication channel. In one aspect, the connection may be based upon the bandwidth available with the user or the resource, thereby establishing the communication channel between the user and the resource of the web service.

According to various embodiments of the present subject matter, the system may record each interaction of the user and the resource across at least one mode of the communication channel. In one aspect, the system 102 may also provide a compliance solution to an administrator of the web service based upon the geographical location of the user and the resource. In one aspect, the system 102 may be integrated with the web service via an Application Programming Interface (API), a widget to the website, a plug-in option or an add-on option in an internet browser and others. The system 102 also provides a set of standard layouts and a set of functionality in the widget. In one aspect, the system 102 may also be scaled by integrating with one or more of big data, IoT devices, a distributed computing architecture and a multitenant system.

Figure 2:
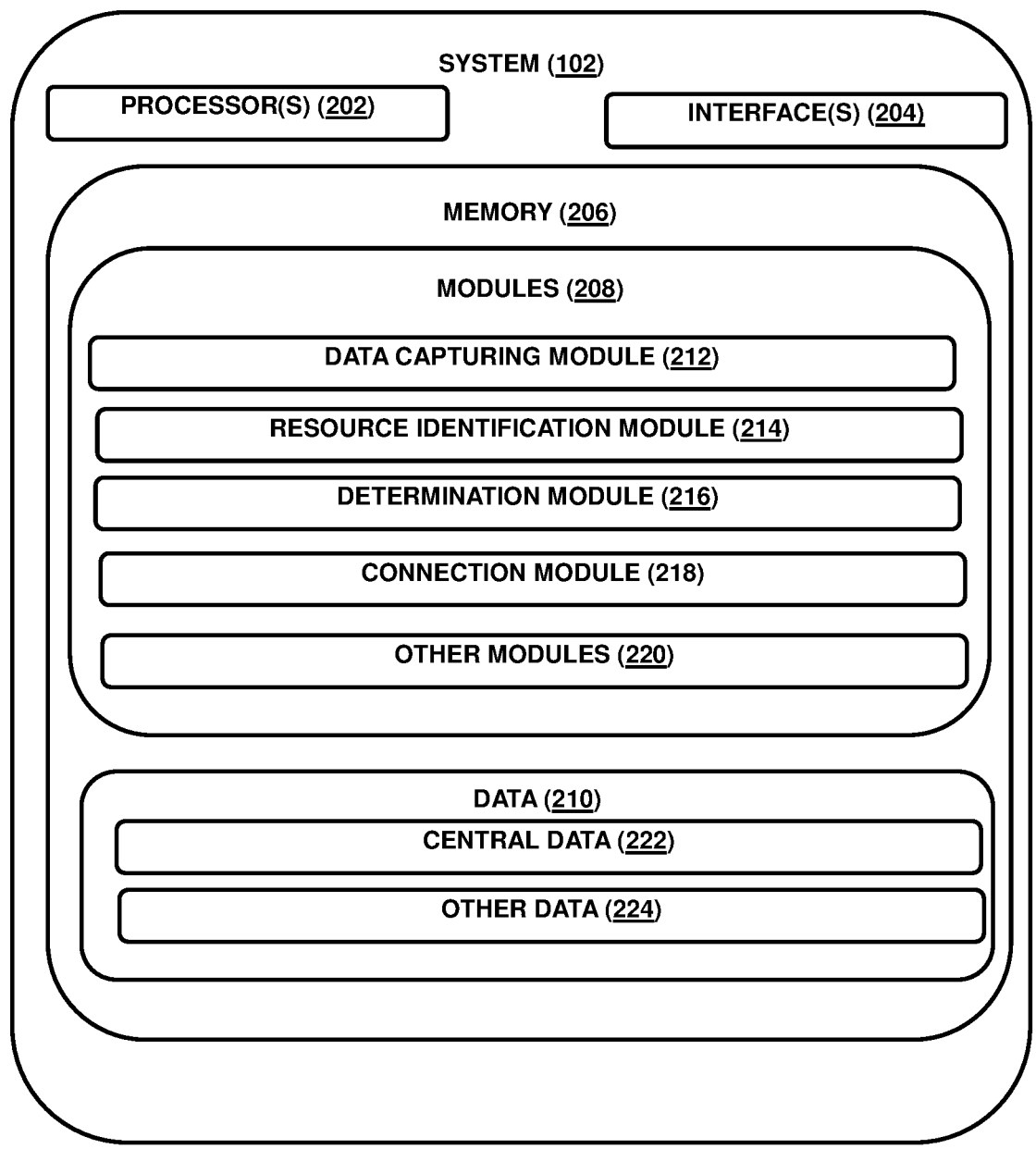
FIG. 2 illustrates the system, in accordance with an embodiment of the present subject matter.
Figure 3:
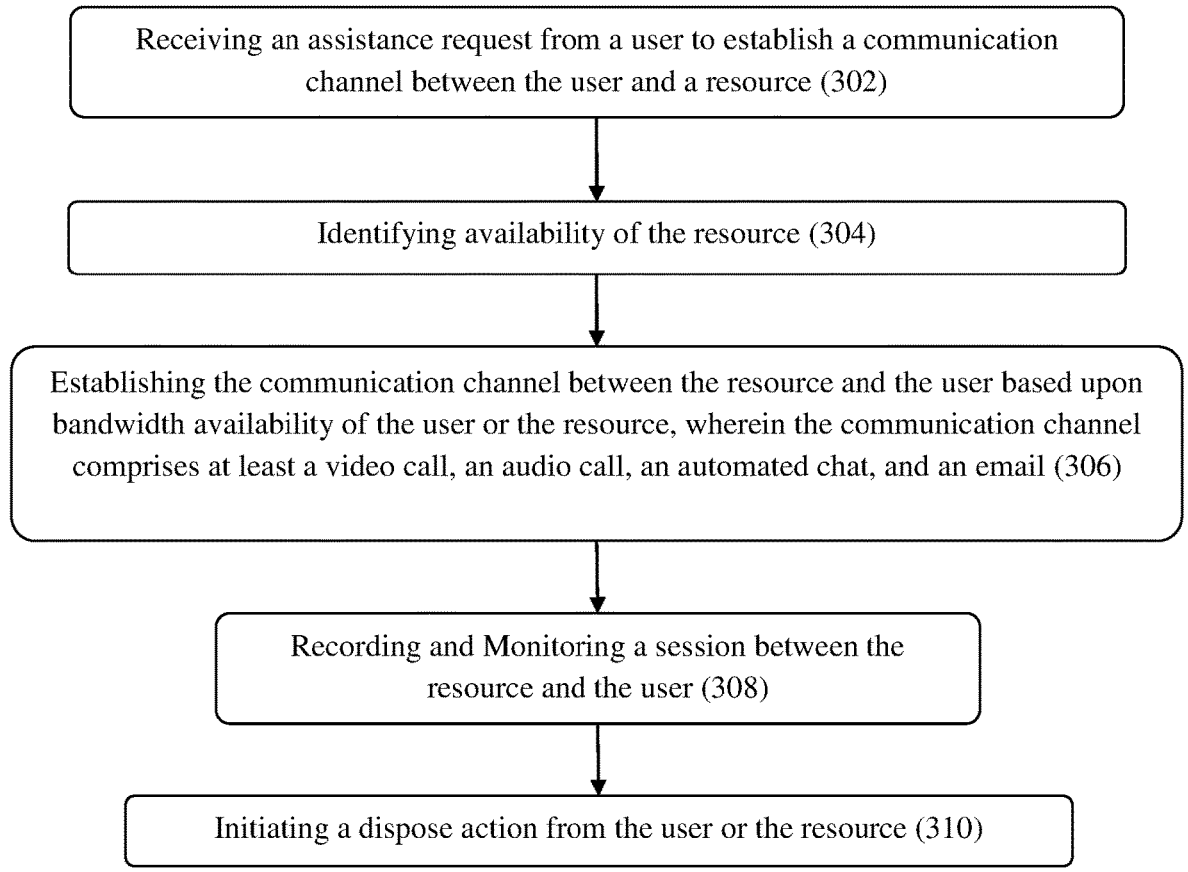
FIGS. 3, 4, 5, 6, 7, 8, and 9 illustrates a flow chart of the system, in accordance with an embodiment of the present subject matter.
Figure 4:
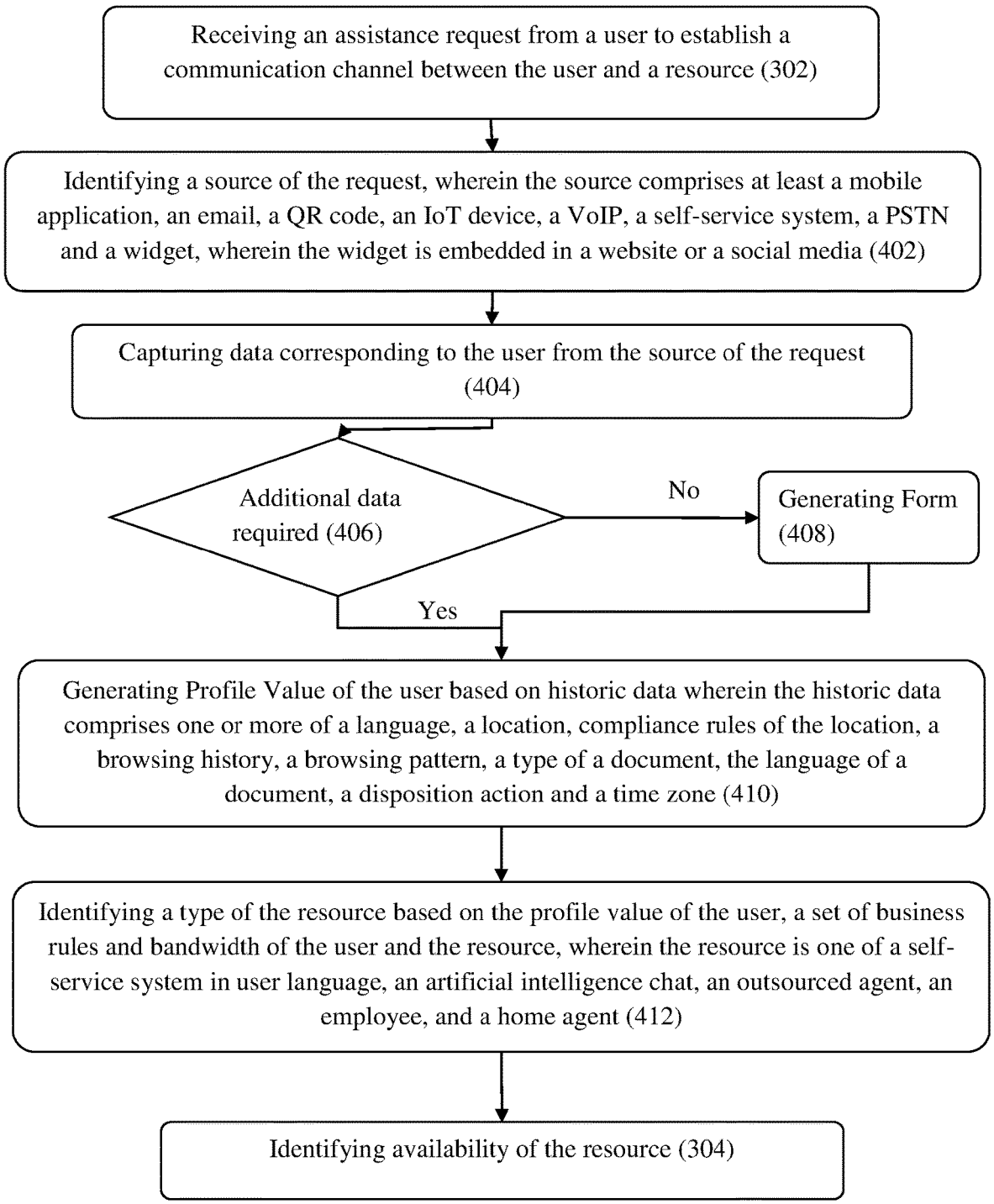
Figure 5:
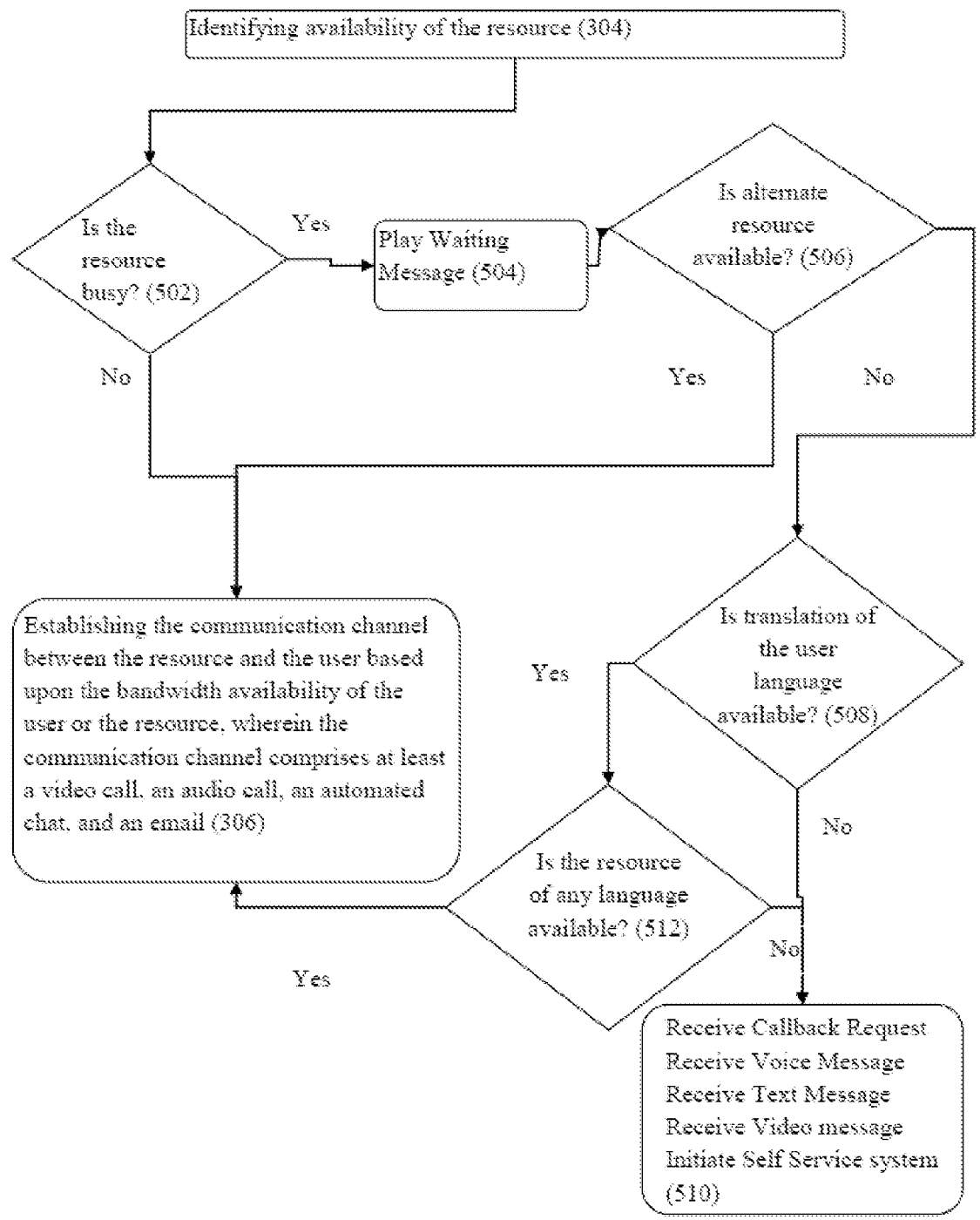
Figure 6:
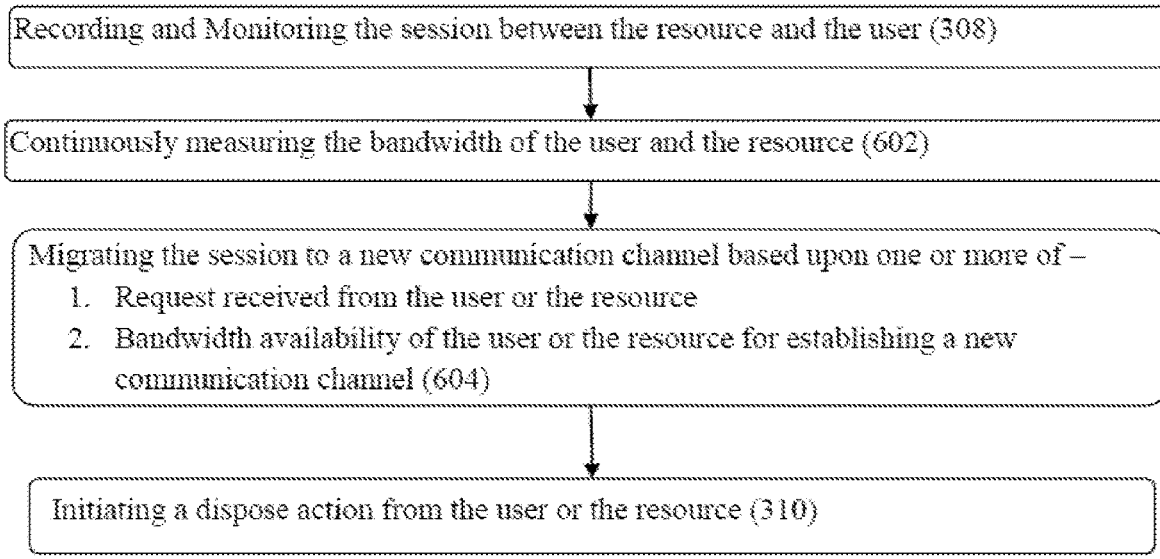
Figure 7:
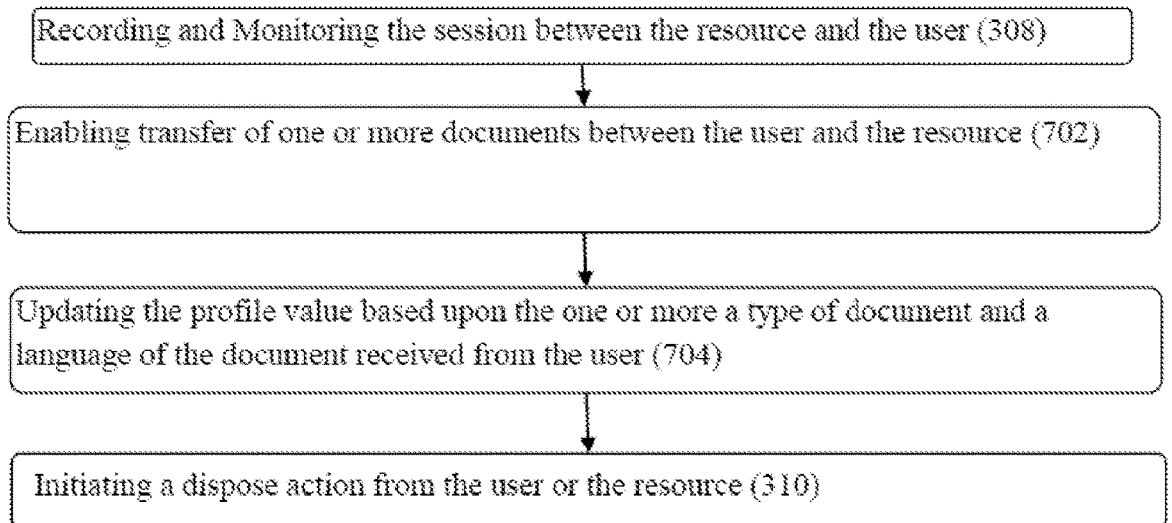
Figure 8:
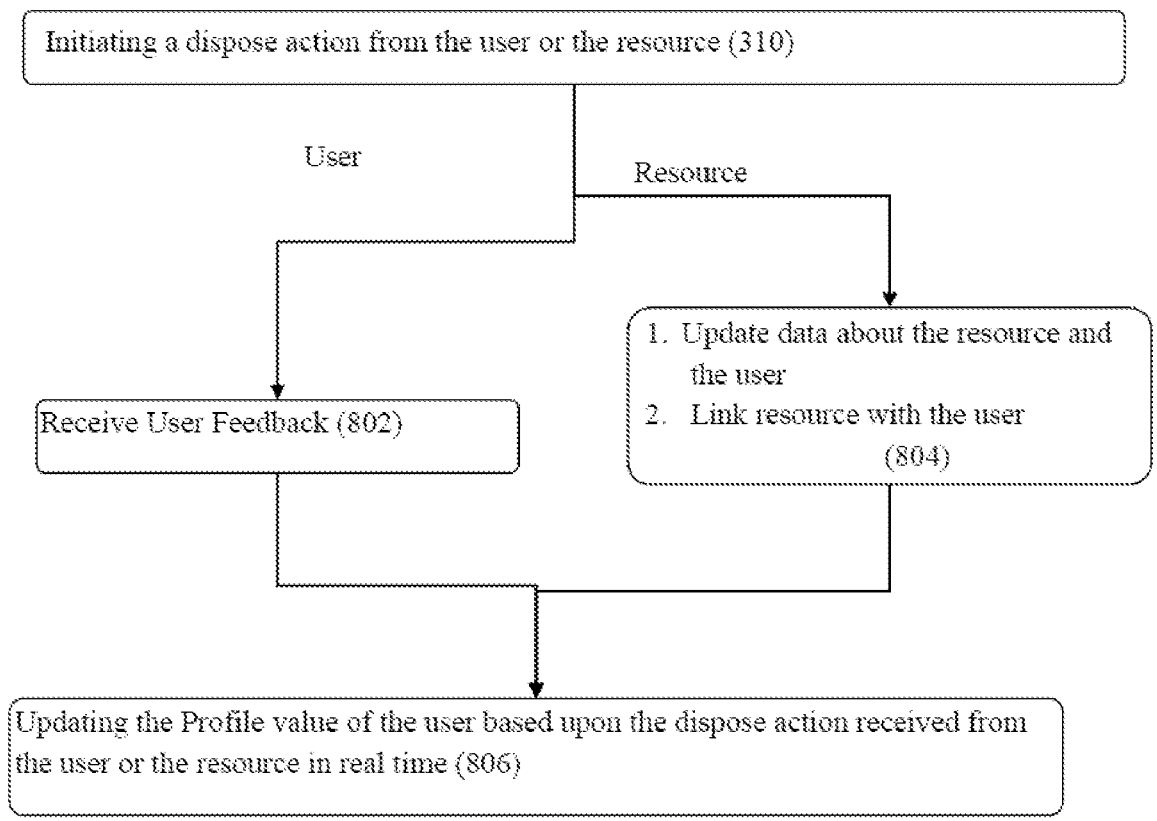

Referring now to FIG. 2, the system 102 is illustrated in accordance with an embodiment for establishing communication channel between the user and the resource. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, cloud storages and magnetic tapes. The memory 206 may include modules 208 and data 210.

The modules 208 include routines, programs, objects, components, data structures, etc., which perform particular tasks or implement particular abstract data types. In one implementation, the modules 208 may include a data capturing module 212, a resource identification module 214, a determination module 216, a connection module 218, and other modules 220. The other modules 220 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208 of the system 102 for establishing communication channel between the user and the resource. The data 210 may also include a central data 222, and other data 224. The other data 224 may include data generated as a result of the execution of one or more modules in the other modules 220.

As there are various challenges observed in the existing art, the challenges necessitate the need to build the system 102 for establishing communication channel between the user and the resource. In order to establish the connection, at first, the user may use the client device 104 to access the system 102 via the I/O interface 204. The user may register using the I/O interface 204 in order to use the system 102. In one aspect, the user may access the I/O interface 204 of the system 102. The system 102 may employ the data capturing module 212, the resource identification module 214, the determination module 216, and the connection module 218. The detail functioning of the modules is described below with the help of FIG. 2.

Data Capturing Module 212

In one embodiment, the data capturing module 212 captures data corresponding to a user of a web service. In one example, the data may comprise at least one of a user name, a user ID, a language, a location, compliance rules of the location, a browsing history, a browsing pattern, a type of a document, a language of the document, a disposition action, a time zone, and the like.

In another embodiment, prior to capturing the data, the data capturing module 212 may receive an assistance request from the user to establish a communication channel between the user and the resource. Further to receiving the assistance request, the data capturing module 212 may identify a source of the assistance request where the source comprises at least a mobile application, an email, a QR code, an Internet of Things (IoT) device, a Voice over Internet Protocol (VoIP) device, a self-service system, a Public Switch Telephone Network (PSTN), a widget embedded in a website or a social media and the like. Subsequent to identification of the source of the assistance request, the data capturing module 212 may capture data corresponding to the user from the source. In one example, when the source of the assistance request is from the PSTN or the widget embedded in the website, the data capturing module 212 may not capture historic data corresponding to the user. The historic data comprises the language, the location, the compliance rules of the location, the browsing history, the browsing pattern, the type of the document, the language of the document, the disposition action and the time zone. Further, the data capturing module 212 may generate a profile value of the user based on the historic data corresponding to the user. In order to generate the profile value of the user requesting assistance from the PSTN or the widget embedded in the website, the data capturing module 212 may generate a form, a quiz, a questionnaire and the like, to capture additional data corresponding to the user. In another embodiment, the data capturing module 212 may update the profile value of the user based on a dispose action and the data corresponding to a transfer of the one or more documents between the user and the resource. In one aspect, the data capturing module 212 may also fetch data about subscription of the user to the web service. If the subscription is in active stage the data capturing module 212 may capture data corresponding to the user, else an error message may be generated. In one aspect, the data capturing module 212 may create a repository for storing each interaction of the user and the resource across the communication channel. It may be understood that the data capturing module 212 may store the data corresponding to the user in the central data 222.

Resource Identification Module 214

Further to capturing the data, the resource identification module 216 identifies the resource based on comparison of one or more attribute of the resource with the data. In one aspect, the attribute comprises a spoken language, a preferred language, a field of expertise, a geographic location, a time zone, a network information, a device information of the resource, and the like.

In one embodiment, the resource identification module 214 may also identify the resource based on a type of the resource based on the profile value of the user, a set of business rules and a bandwidth of the user and the resource. Examples of the resource may be a self-service system in user language, an artificial intelligence chat, an outsourced agent, an employee, a home agent, and the like. In one aspect, the resource may also be categorized based upon matching of the field of expertise of the resource and the browsing history of the user. In one aspect, the resource identification module 214 may identify the resource based upon the spoken language of the resource and the language preference of the user. In one aspect, the resource identification module 214 may identify the resource when the bandwidth available with the user matches with a network information of the resource. In another embodiment, if the resource is offline, the resource identification module 214 may identify the resource based upon one or more of the aforementioned attributes corresponding with the data and notify the resource to connect with the user.

Further to identifying the type of resource, the resource identification module 214 may identify the availability of the resource. When the resource may be found to be busy, the resource identification module 214 may play a waiting message while identifying an alternate resource to connect to the user. In one aspect, the waiting message may be an audio or a video advertisement, a jingle, a promotional event, and the like, based on the data corresponding to the user. In one example, the resource identification module 214 may play the waiting message in the language of the user. In another embodiment, when the resource and the alternate resource is found to be busy, the resource identification module 214 may identify a translation for the language of the user from the central data 222. Upon identifying the translation of the language, the resource identification module 214 may identify availability of the resource of any language. In one aspect, the resource of any language may be situated in a same or different time zone as compared to the time zone of the user. Once the resource identification module 214 identifies the resource, the resource and the user may be connected. In another embodiment, when neither of the translation for the user language nor the resource of any other language is available, the resource identification module 214 may request the user to submit a callback request, a voice message, a text message, initiate the self-service system in the user language and others. It may be understood that upon receiving the request from the user, the resource identification module 214 may initiate the self-service system in the language of the user as a default mode of interaction with the user.

Determination Module 216

Further to identification of the resource, the determination module 216 determines at least one mode of a communication channel between the user or the resource by comparing bandwidth of the communication channel available with one of the user and the resource. In one aspect, the communication channel may comprise at least a video call, an audio call, an automated chat, an email, and the like. It may be understood that the predefined threshold of the bandwidth indicates minimum bandwidth availability at the system 102 in order to connect the user and the resource via at least one of the communication channel. The predefined threshold of the bandwidth may be different for each of the communication channel. It may be understood that the predefined threshold of the bandwidth may be highest for the video call and lowest for the automated chat. In one example, when bandwidth of the communication channel available with one of the user or the resource is not available, the determination module 216 may determine PSTN as a mode of the communication channel between the user and the resource. In one aspect, the communication channel determination module 216 may provide a unified communication channel to connect the user and the resource. The unified communication channel connects the user and the resource over multiple communication channels in real time.

In one embodiment, the determination module 216 may monitor change in bandwidth of the communication channel available with one of the user or the resource for establishing a new communication channel. When the bandwidth of the user or the resource falls below the predefined threshold of the bandwidth for the communication channel, the determination module 216 may transfer the communication channel to the new communication channel suitable for the bandwidth of the user and the resource. Similarly, when the bandwidth of the user or the resource is detected to be higher than the predefined threshold of the bandwidth the communication channel, the determination module 216 may transfer the communication channel to the new communication channel suitable for the bandwidth of the user and the resource.

Connection Module 218

Further to determination of the communication channel, connection module 218 connects the resource to the user via the at least one mode of the communication channel. In one embodiment, the connection module 218 may monitor a session between the user and the resource of the web service and the bandwidth of the communication channel available with one of the user or the resource. In one aspect, the connection module 218 may initiate the session after establishing the communication channel between the user and the resource of the web service. Further to initiating the session, the connection module 218 may receive a document from the user during the session. In one embodiment, the connection module 218 may transmit the document to the user during the session.

In one embodiment, the connection module 218 may transfer the session to a new communication channel based on one or more of a request received from the user or the resource and change in bandwidth of the communication channel available with one of the user or the resource for establishing a new communication channel. In another embodiment, the connection module 218 may initiate a dispose action on receiving a dispose request from at least the user or the resource. In one aspect, the connection module 218 may update the profile value of the user based on the feedback received from the user and the resource.

In order to explain the functioning of the aforementioned modules, consider an example where a user visits a web service and requests assistance from the resource of the web service. Referring now to FIGS. 3, 4, 5, 6, 7, and 8 initially, at step 302, the data capturing module 212 may receive an assistance request from the user to establish the communication channel between the user and the resource. Prior to receiving the assistance request, the data capturing module 212 may register the user by receiving user name, user ID, language, email address and the like. Further to receiving the assistance request, at step 402, the data capturing module 212 may identify the source of the assistance request. Example of the source of the request comprises a mobile application, an email, a QR code, an Internet of Things (IoT) device, a Voice over Internet Protocol (VoIP), a self-service system, a Public Switched Telephone Network (PSTN), a widget over a website or a social media, and the like. Examples of the web service include, but not limited to, an e-commerce platform, a distributor, a work force management channel, a call center, an employment service, a manufacturing center, a service delivery processes, global offices, logistics arms, a finance service, Human Resource (HR), a dealer, a stockiest, a retail outlet, field employees, commission resources/brokers and the like. Further to identifying the source, at step 404, the data capturing module 212 may capture the data corresponding to the user from the source of the assistance request. In one aspect, the data may comprise a user name, a user ID, a language, a location, compliance rules of the location, a browsing history, a browsing pattern, a type of a document, a language of the document, a disposition action, a time zone and the like. At step 406, the data capturing module 212 may examine if additional data is required to generate a profile value of the user. When the source of the assistance request is from the PSTN or the widget embedded in the website, the data capturing module 212 may not capture historic data corresponding to the user. The historic data comprises the language, the location, the compliance rules of the location, the browsing history, the browsing pattern, the type of the document, the language of the document, the disposition action and the time zone. At step 408, the data capturing module 212 may generate a form, a quiz and the like, to capture the additional data corresponding to the user. In one aspect, when the source of the request is the PSTN call or the widget over the website, the data capturing module 212 may require the additional data comprising location, language, time zone and the like, to generate a profile value of the user. In another aspect, when the request is received from the mobile application, the widget of the social media, and the QR code, the data capturing module 212 may capture additional data comprising time zone of the user, location of the user, and the bandwidth available with the user. Further to capturing the data corresponding to the user, at step 410, the data capturing module 212 may generate profile value of the user based on historic data. In one embodiment, the data capturing module 212 may generate the profile value of the user based on a Big data analysis, data captured from a Customer Relationship Management (CRM) system and the like. The CRM system compiles data from a range of communication channels including the website, the PSTN, the email, live chat, the documents, the social media and the like. It may be understood that the data capturing module 212 may update the profile value of the user, in real time, based on exchange of the documents between the user and the resource.

In one example, the profile value of the user indicates a level of importance of the user to the web service. The user with the highest profile value may be the most important to the web service and similarly the user with the lowest profile value may be the least important to the web service.

Subsequent to the generation of the profile value, the resource identification module 214 may identify the resource based on comparison of one or more attribute of the resource with the data. Examples of the attribute may include a spoken language, a preferred language, a field of expertise, a geographic location, a time zone, a network information, a device information of the resource, and the like. In one aspect, at step 412, the resource identification module 214 identifies a type of the resource based on the profile of the user, a set of business rules and bandwidth of the user and the resource. Examples of the resource is a self-service system in the user language, an artificial intelligence chat, an outsourced agent, an employee, a home agent, and the like. The set of business rules comprise a cost estimation of the resource for assisting the user. In one aspect, the resource identification module 214 may identify the resource as a self-service system for the user of the lowest profile. While the resource identification module 214 may identify the employee of the web service for assisting the user with the highest profile value. In one aspect, the identification of the resource may also depend on the amount of products or services selected by the user.

Further to identification of the type of the resource, at step 304, the resource identification module 214 may identify availability of the resource. At step 502, the resource identification module 214 may examine if the resource is busy. In one aspect, the resource identification module 214 may examine if the resource is available on the website, the mobile application, the PSTN call, and the like. When the resource is not available on the website, the mobile application, the PSTN call, and the like, at step 504, the resource identification module 214 may play a waiting message while examining availability of an alternate resource, at step 506, to connect to the user. When the alternate resource is not available on the website, the mobile application, the PSTN call, and the like, at step 508, the resource identification module 214 may examine availability of the translation of the user language from the central data 222. When the translation of the user language is available, at step 512, the resource identification module may examine the availability of the resource of any language to connect to the user. When the translation of the user language or the resource of any language is not available, at step 510, the resource identification module 214 may receive a call back request, a voice message, a text message, a video message and the like. Further, at step 510, the resource identification module 214 may initiate the self-service system in the user language in order to assist the user. At step 306, when the resource is not busy, at step 512, when the alternate resource is available, at step 506, or when the resource of any language is available, at step 512, the connection module 218 may establish the communication channel between the user and the resource based upon the bandwidth availability of the resource and the user.

In one embodiment, at step 306, the determination module 216 may determine at least one mode of a communication channel between the user or the resource by comparing the bandwidth available with the user or the resource and a predefined threshold of the bandwidth. Examples of the communication channel are a video call, an audio call, an automated chat, an email, and a PSTN call. It may be understood that the threshold of the bandwidth for a video call may be the highest and for the automated chat may be the lowest.

In one embodiment, the waiting message may be a jingle, an advertisement, a promotional audio or video message, a campaign, and the like. It may be understood that the waiting message may be played when the resource is busy or when the resource turns down the communication channel to a "hold" mode.

Further to establishing the communication channel, the connection module 218 may initiate a session between the user and the resource. At step 308, the connection module 218 may record and monitor session between the resource and the user. In one aspect, at step 602, the connection module 218 may continuously measure the bandwidth of the user and the resource. At step 604, the connection module 218 may migrate the session to a new communication session based on request received from the user or the resource and the bandwidth availability for establishing a new communication channel. In one aspect, the migration of the session from the communication channel to the new communication channel may be based upon the set of business rules. Further to the aforementioned steps, at step 310, when query of the user is resolved, the connection module 218 may initiate a dispose action from the user or the resource.

In another embodiment, further to initiating the session, at step 702, the connection module 218 may enable transfer of one or more documents between the user and the resource. In one aspect, the user may request the resource for transfer of the one or more documents related to the product or service offered by the web service. In one aspect, the resource may request the user to transfer one or more documents for a purpose of authentication, registration and the like. In one aspect, the one or more documents corresponding to the user may be stored in the central data 222. In another embodiment, the profile value of the user may be updated, in the real time, based on the transfer of one or more of the documents.

In one embodiment, the connection module 218 may initiate recording the session based elements as duration of the session, type of an issue, domain of the issue, actions of the resource, response of the user and the like. The connection module 218 may store the recording of each session at central data 222. Further, the connection module 218 may monitor the interactions of the resource and transmit the real time data to a supervisor where the supervisor is an expert in the domain of the issue and is the resource with higher cost. In one aspect, the supervisor may interrupt between the session, of the resource and the user, and provide assistance to the user. In one aspect, the set of business rules may be based on the time of the session between the resource and the user. In one aspect, when the duration of the session increases cost of the resource, the connection module 218 may migrate to the new communication channel where the cost of the resource is less than the cost of the product or the service selected by the user. In one example, the resource identification module 214 may identify the resource based on the availability of the resource linked with the user.

Further to initiating the dispose action, at step 802, the connection module 218 may receive a feedback of the user. Similarly, at step 804, the connection module 218 may update the data corresponding to the user in central data 222 and also link the resource with the user. At step 806, the connection module 218 may update the profile value of the user, in real time, based upon the dispose action received from the user or the resource.

Figure 9:
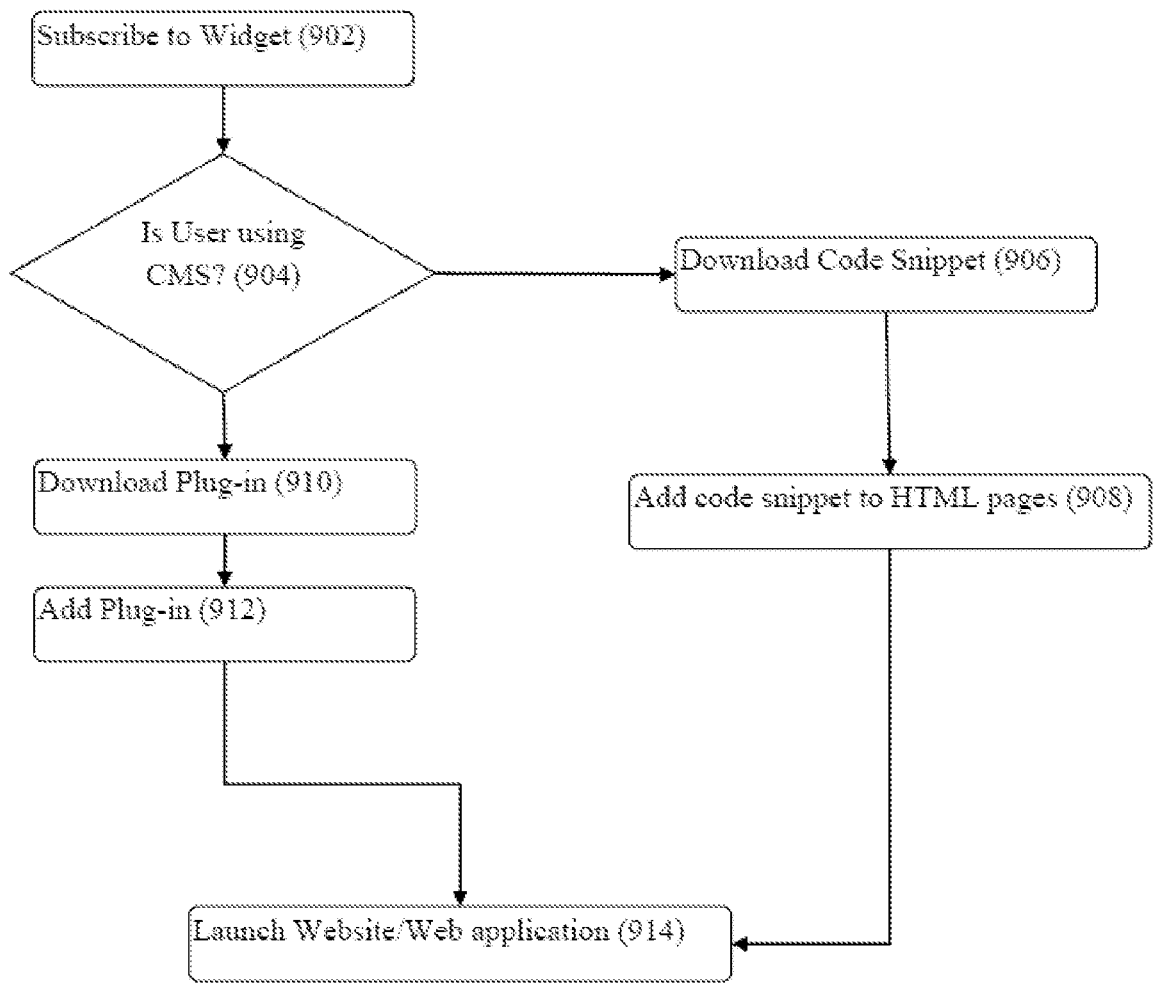

In one embodiment, the aforementioned functionality may be accessed by downloading the mobile application, scanning the QR code, clicking a connection link in the email, initiating the PSTN call, clicking the widget over the website or the social media and the like. In one example, the system may offer the assistance of the resource only to registered users. It may be understood that the system may register the users by receiving personal data comprising user name, user ID, language, email address and the like. In order to avail the assistance, referring now to FIG. 9, at step 902, the user may be subscribed to the widget. At step 904, the system may examine a web service platform of the user. At step 910, when the web service platform is a Content Management System (CMS) a predefined plug-in for the CMS may be downloaded. Examples of the CMS are WordPress, Drupal, Joomla, Expression Engine, Text Pattern, Radiant CMS, Cushy CMS, Silver Stripe and the like. At step 912, the plugin may be added to the web service platform. At step 906, when the web service platform is not the CMS, the code snippet for the widget may be downloaded. At step 908, the code snippet may be added to the HTML pages of the web service platform. After successful addition of the code snippet or the plug-in, the web service platform may be launched along with the widget. In another example, the user may select a subscription pack out of an annual subscription, a monthly subscription, a quarterly subscription, a half yearly subscription and the like. When the subscription of the user is not active, an error message may be generated. In one aspect, the user may be prompted to select the subscription pack in order to avail the assistance.

Figure 10:
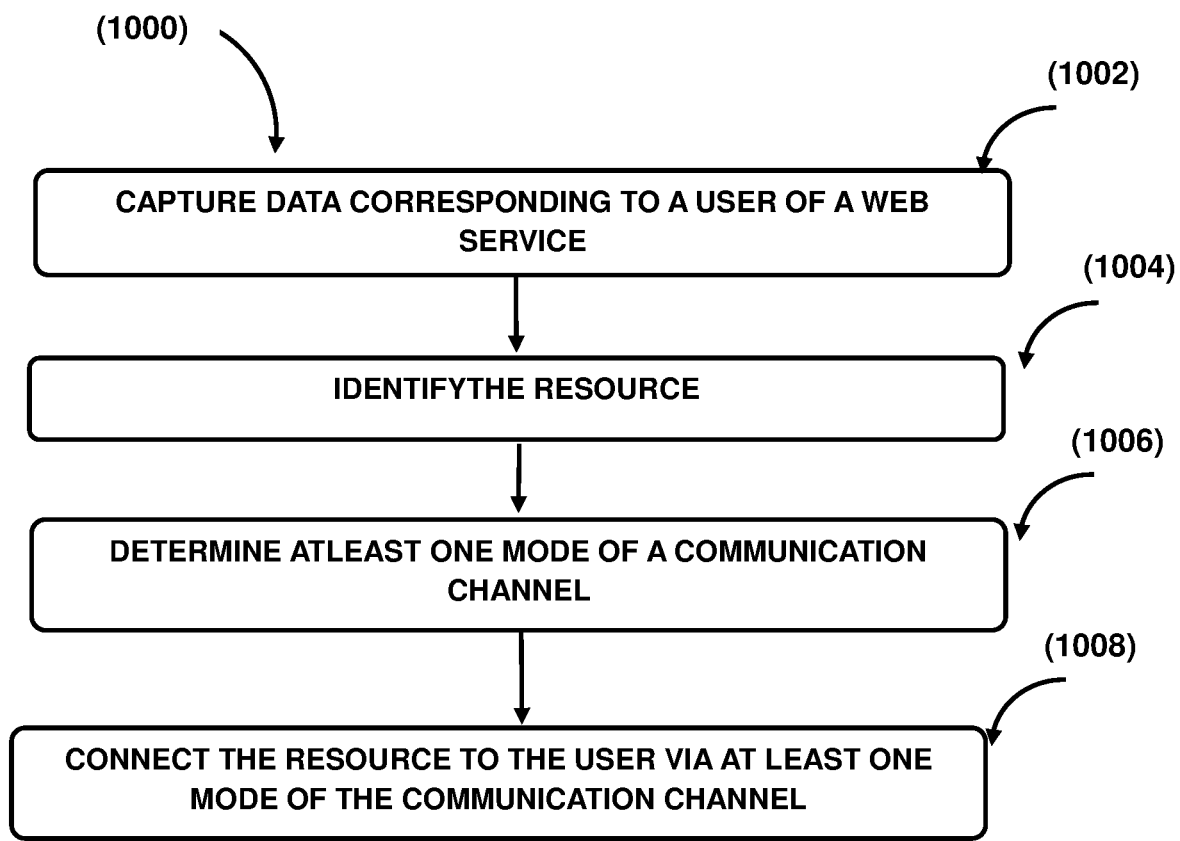
FIG. 10 illustrates a method for establishing communication channel between the user and the resource, in accordance with an embodiment of the present subject matter.

Referring now to FIG. 10, a method 1000 for establishing communication channel between a user and a resource is shown, in accordance with an embodiment of the present subject matter. The method 1000 may be described in the general context of computer executable instructions. Generally, computer executable instructions can include routines, programs, objects, components, data structures, procedures, modules, functions, etc., that perform particular functions or implement particular abstract data types. The method 1000 may also be practiced in a distributed computing environment where functions are performed by remote processing devices that are linked through a communications network. In a distributed computing environment, computer executable instructions may be located in both local and remote computer storage media, including memory storage devices.

The order in which the method 1000 for establishing communication channel between a user and a resource is described is not intended to be construed as a limitation, and any number of the described method blocks can be combined in any order to implement the method 1000 or alternate methods. Additionally, individual blocks may be deleted from the method 1000 without departing from the spirit and scope of the subject matter described herein. Furthermore, the method can be implemented in any suitable hardware, software, firmware, or combination thereof. However, for ease of explanation, in the embodiments described below, the method 1000 may be considered to be implemented as described in the system 102.

At block 1002, data corresponding to a user of a web service is captured. In one example, the data comprise data comprises of at least one of a user name, a user ID, a language, a location, compliance rules of the location, a browsing history, a browsing pattern, a document, a feedback of the resource, a disposition action, a time zone, and the like. In one implementation, the data capturing module 212 captures data corresponding to a user of a web service and store the data in the central data 222.

At block 1004, a resource is identified. In one example, the resource is identified based on comparison of one or more attribute of the resource with the data. In one aspect, the attribute comprises a spoken language, a preferred language, a field of expertise, a geographic location, a time zone, a network information, and a device information of the resource. In one implementation, the resource identification module 214 identifies the resource where the resource is identified based on comparison of one or more attribute of the resource with the data and stores the attribute in the central data 222.

At block 1006, at least one mode of a communication channel between the user or the resource is determined. In one example, the communication channel comprises at least a video call, an audio call, an automated chat, an email, and a PSTN call. In one implementation, the determination module 216 determines at least one mode of a communication channel between the user or the resource by comparing bandwidth of the communication channel available with one of the user and the resource and stores the bandwidth of the user or the resource in the central data 222.

At block 1008, the resource may be connected to the user via at least one mode of the communication channel. In one example, the connection is based upon the bandwidth available with the user or the resource. In one implementation, the connection module 218 connects the resource to the user via at least one mode of the communication channel and stores information related to the connection in the central data 222.

Exemplary embodiments discussed above may provide certain advantages. Though not required to practice aspects of the disclosure, these advantages may include those provided by the following features.

Some embodiments enable a system and a method to provide multi lingual platform for the user and the resource. The system changes user interface to the language preference of the user and the spoken language of the resource thereby providing digital inclusion.

Some embodiments enable a system and a method to provide various analytics on global data sets for identifying usage trends of the web service platforms in a real time.

Some embodiments enable a system and a method to provide ease of monitoring and setting alerts on the global data set.

Some embodiments enable a system and a method to provide a unified communication channel integrating each mode of the communication channel into one framework.

Some embodiments enable a system and a method to provide compliance solutions related to the location of the resource and the user.

Some embodiments enable a system and a method to monitor risk associated with the data of the user.

Some embodiments enable a system and a method to provide assistance in the language of the user.

Some embodiments enable a system and a method to distribute the traffic of the user to the global resources.

Although implementations for methods and systems for establishing communication channel between the user and the resource have been described in language specific to structural features and/or methods, it is to be understood that the appended claims are not necessarily limited to the specific features or methods described. Rather, the specific features and methods are disclosed as examples of implementations for establishing communication channel between the user and the resource.

We claim:

1. A method for connecting a user to remote service resources, the method comprising:
    receiving, at a remote web service, a request from the user to connect to one of the remote service resources, wherein the request to connect to one of the remote service resources is originating from one of a plurality of originating access sources;
    determining, by the remote web service, user attributes associated with the user based on the request to connect to one of the remote service resources;
    determining, by the remote web service, a bandwidth availability associated with the user;
    comparing, by the remote web service, the user attributes to attributes of the remote service resources;
    based on said comparision of attributes, identifying a particular remote service resource of the remote assistance resources that matches the user attributes;
    comparing the bandwidth availability associated with the user and another bandwidth availability associated with the particular remote service resource to bandwidth thresholds associated with communication channels of the particular remote service resource;
    based on said comparisons of bandwidth availabilities of the user and the particular remote service resource, selecting an optimal communication mode from multiple available communication modes of the particular remote service resource comprises:
        matching the bandwidth availability associated with the user and the particular remote service resource to predefined bandwidth thresholds of the multiple available communication modes of the particular remote service resource, by:
        selecting a video call mode of the multiple available communication modes of the particular remote service resource when the bandwidth availability exceeds a first predefined threshold associated with the video call mode;
        selecting an audio call mode of the multiple available communication modes of the particular remote service resource when the bandwidth availability exceeds a second predefined threshold associated with the audio call mode is lower than the first predefined threshold;
        selecting an automated chat mode of the multiple available communication modes of the particular remote service resource when the bandwidth availability is lower than the second predefined threshold associated with the audio call mode; and
        selecting a public switched telephone network (PSTN) mode of the multiple available communication modes for the user and the particular remote service resource when the bandwidth availability associated with the user and the particular remote service resource are indeterminate; and
    establishing, using one of the plurality of originating access sources, a personalized communication channel between the user and the particular remote service resource via the optimal communication mode.

2. The method of claim 1, further comprising:
    recording all communications exchanged over all communication modes in the personalized session.

3. The method of claim 1, further comprising:
    monitoring, in real-time, a personalized session between the user and the particular remote service resource across multiple communication modes;
    detecting a change in the monitored session over the optimal communication mode; and migrating the session to a new communication mode, in response to detecting said change.

4. The method of claim 3, wherein detecting the change in the personalized communication session comprises:
    detecting a change in the bandwidth availability associated with the user and the particular remote service resource.

5. The method of claim 1, further comprising:
    monitoring, in real-time, a session between the user and the particular resource over the optimal communication mode;
    determining that a request for assistance received from the user has been resolved; and
    initiating a dispose action in real-time by updating a profile associated with the user that is maintained by the remote web service.

6. The method of claim 5, wherein the dispose action comprises:
    collecting, from the user, feedback about the session; and
    based on the collected feedback about the profile associated with the user that is maintained by the remote web service.

7. The method of claim 5, wherein the dispose action comprises:
    updating, by the particular assistance resource, user data in the profile maintained by the remote web service; and
    linking the particular assistance resource to the user, in the user data.

8. The method of claim 1, wherein one of the plurality of originating access sources for the request to connect to one of the remote service resources is an Internet of Things (IoT) device.

* * * * *